D. W. EVANS.
MOLE PLOW.
APPLICATION FILED AUG. 15, 1908.
906,788.
Patented Dec. 15, 1908.
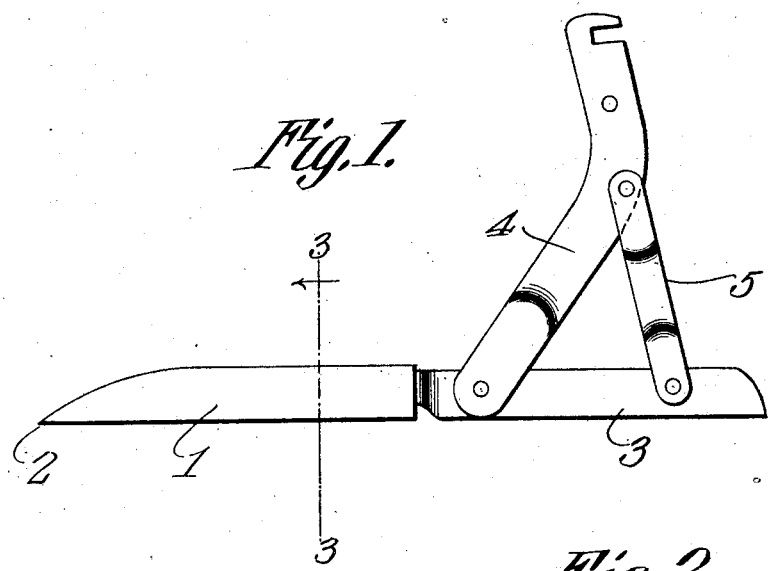
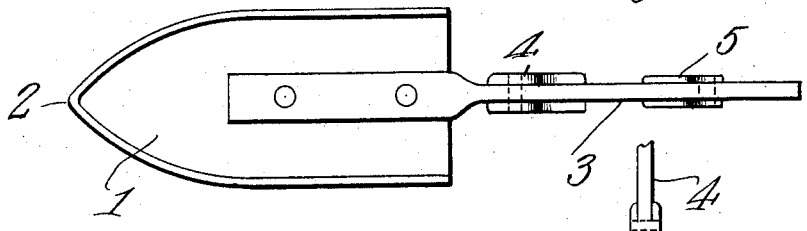
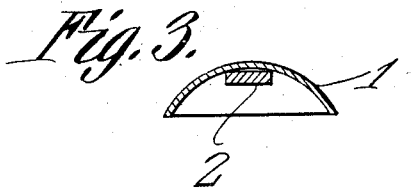
Inventor
Doctor W. Evans.
Witnesses
By C. A. Snow & Co.
Attorneys

UNITED STATES PATENT OFFICE.

DOCTOR WALDO EVANS, OF EATON, OHIO.

MOLE-PLOW.

No. 906,788.  Specification of Letters Patent.  Patented Dec. 15, 1908.

Application filed August 15, 1908. Serial No. 448,684.

*To all whom it may concern:*

Be it known that I, DOCTOR WALDO EVANS, a citizen of the United States, residing at Eaton, in the county of Preble and State of Ohio, have invented a new and useful Mole-Plow, of which the following is a specification.

This invention has relation to mole plows and it consists in the novel construction and arrangement of its parts as hereinafter described.

The object of the invention is to provide a plow of the character indicated of special construction and which is adapted to operate under the surface of the soil and shift the soil laterally, without unnecessarily agitating the surface thereof.

The plow is especially adapted for cultivating purposes, and may be used singly or in a gang arranged as desired. It may also be used to advantage as a weeder or crop thinner.

The plow consists primarily of a concave-convex elongated plate, to the concave side of which is attached a heel which projects at its rear portion beyond the rear edge of the said plate, and which has its lower edge occupying the same plane as the lower edges of the plate. A standard is connected at its lower end with the said heel as is also a brace, the upper end of the brace being connected with the said standard.

In the accompanying drawing:—Figure 1 is a side elevation of the plow. Fig. 2 is a bottom plan view of the same. Fig. 3 is a transverse sectional view of the same cut on the line "3—3" of Fig. 1, and Fig. 4 is a rear elevation of the device with the plates removed.

The plow consists of the elongated concavo-convex plate 1, which is pointed at its forward end as at 2. The forward end portion of the heel 3 is attached to the concaved face of the plate 1 and the rear end portion of the said heel 3 projects beyond the rear end of the said plate 1. The lower edge of the heel 3 occupies the same plane as that occupied by the lower edges of the plate 1. The lower end of the standard 4 is connected with the heel 3 just behind the rear edge of the plate 1 and the lower end of the brace 5 is connected with the heel 3, said brace having its upper end connected with the standard 4.

From the above description it is obvious that as the plow is moved along a furrow that the plate 1 will cut under the surface of the soil and will have a tendency to move the same laterally with the effect of leveling the soil without unnecessarily disturbing the surface thereof. At the same time the said plate will cut the roots of vegetation occurring in the furrow, and thus the crop is cultivated. By reason of the fact that the lower end of the heel 3 occupies the same plane as the lower edges of the plate 1, a long bearing is provided for the plow as an entirety, which prevents the implement from operating too deeply in the soil and also assists materially in the leveling effect attained by the plow.

Having described my invention, what I claim as new, and desire to secure by Letters Patent, is:—

A plow comprising an elongated transversely arched plate having a point at its forward end, the side edges and point of said plate being located in the same plane, an elongated heel immovably connected to the lower face of the plate and arranged on edge, said heel being disposed entirely below the plane of the top of the plate and having its lower edge occupying the same plane as that occupied by the lower edges of the plate, and an upwardly and rearwardly inclined standard connected to the heel and fixed relative thereto.

In testimony that I claim the foregoing as my own, I have hereto affixed my signature in the presence of two witnesses.

DOCTOR WALDO EVANS.

Witnesses:
 A. C. RISINGER,
 JOHN RISINGER.